Figure 1:
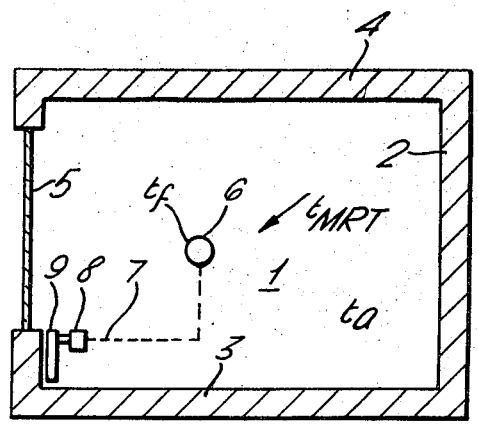

United States Patent

Nielsen

[15] 3,664,193
[45] May 23, 1972

[54] PASSIVE TEMPERATURE SENSOR

[72] Inventor: Peter V. Nielsen, Nordborg, Denmark

[73] Assignee: Danfoss A/S, Nordborg, Denmark

[22] Filed: Apr. 22, 1970

[21] Appl. No.: 30,891

[30] Foreign Application Priority Data

Apr. 28, 1969 Germany .................. P 19 21 570.4

[52] U.S. Cl. ................................ 73/368, 73/355 EM
[51] Int. Cl. .............................. G01k 5/08, G01k 5/10
[58] Field of Search ............ 73/368, 339 R, 339 C, 355 EM; 236/92 R

[56] References Cited

UNITED STATES PATENTS

| 3,266,318 | 8/1966 | Abajian et al. | 73/368 |
| 2,398,333 | 4/1946 | Shoemaker | 73/339 R |
| 2,152,934 | 4/1939 | Trent | 73/368 X |
| 3,531,991 | 10/1970 | Strong et al. | 73/355 R |

Primary Examiner—Louis R. Prince
Assistant Examiner—Daniel M. Yasich
Attorney—Wayne B. Easton

[57] ABSTRACT

A passive temperature sensor for controlling a thermostat or the like. The sensor reacts to the temperature of the air and also to thermal radiation in order to control a thermostat in such a manner to give optimum personal comfort despite relative changes over a period of time between the room air temperature and thermal radiation effects in the room.

19 Claims, 11 Drawing Figures

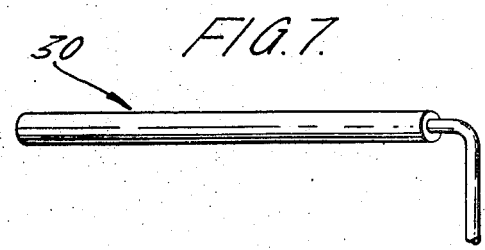
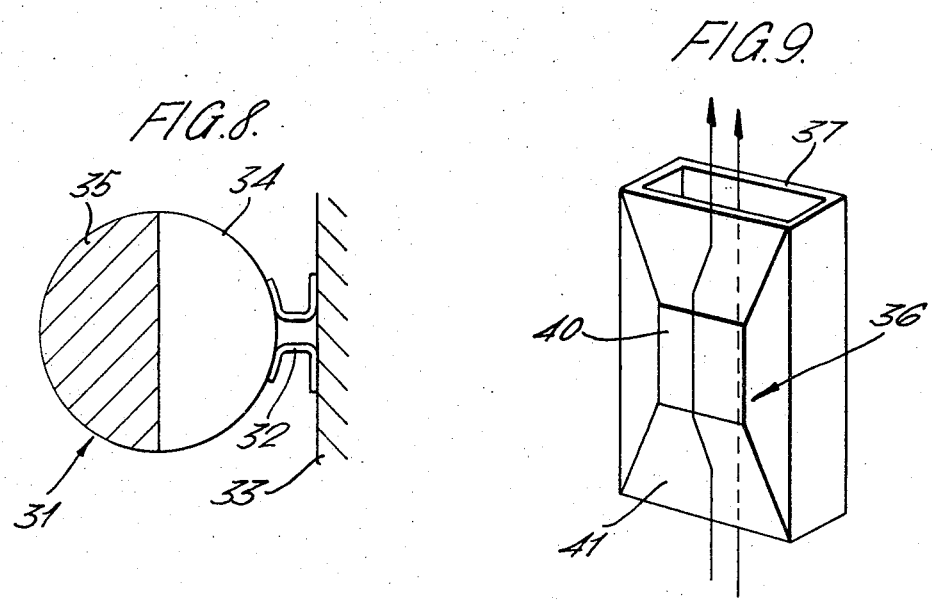
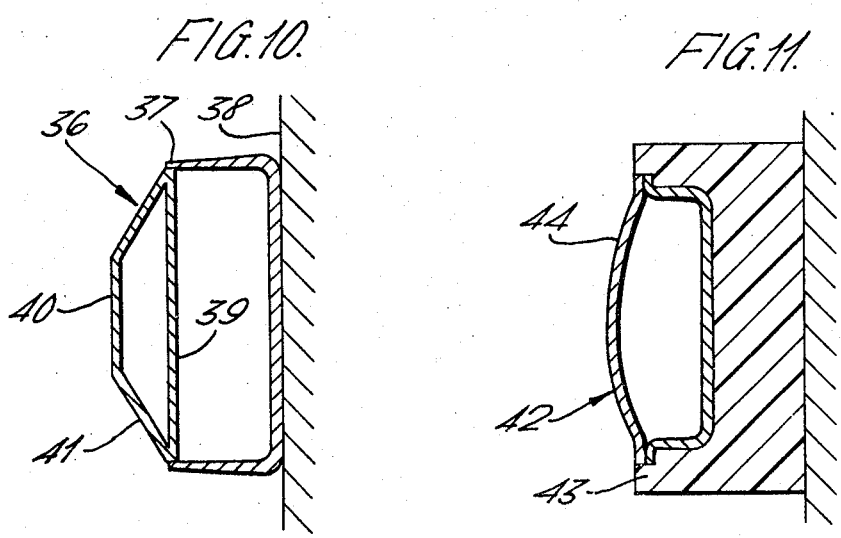

PASSIVE TEMPERATURE SENSOR

The invention relates to a passive temperature sensor for controlling a thermostat or the like, particularly for space-heating.

The usual temperature sensors are so designed that they respond to the temperature of the air in a room. They have to be so arranged that the air in the room can pass over them. As a rule they have a bright metal surface and are accommodated in a slotted casing.

If the heating of a room is controlled in dependence of a temperature sensor of this kind, the temperature of the air in the room can in fact be held at a required value.

It has been found however that the feeling of comfort of a person in a room, the temperature of which is controlled in this manner, depends upon numerous other factors, particularly upon the heat-radiation from the sun or from the heating element, upon the radiation of cold from the windows and the walls, upon the rate of flow of the air within the room, and upon the activity level of the person himself, for example, upon whether he is sitting quietly at a desk or is carrying out heavy physical work. Based on scientific investigations, there has been established a "heat-comfort equation", which relates the various factors to each other and is based on the fact that the condition of greatest well-being occurs when a prescribed equilibrium temperature obtains on the surface of the skin, which temperature is determined by the processes of combustion in the human body and by a certain dissipation of heat from the body to the room.

The knowledge that the activity level has a considerable effect upon the particular conditions of comfort has led to a proposal for developing an active sensor which, with the help of a heating element, reproduces the combustion heat of the body. This however complicates the sensor; in particular it requires additional leads for the heating element.

The object of the invention therefore is to provide a temperature sensor which enables a heat-comfort range to be maintained in a living room, but which is nevertheless of very simple construction.

According to the invention, this object is achieved by the condition of the surface of the sensor being such that the ratio C of the product of the surface $A_S$ (in m$^2$) exposed to heat-radiation and the emission factor $\epsilon$, on the one hand, to the product of the area $A_K$ (in m$^2$) exposed to convection and the factor F (in W · °C$^{-1.25}$ · m$^{-2}$) of the surface-heat-transfer coefficient, on the other hand, is between 0.1 and 0.3, preferably, between 0.14 and 0.25.

A sensor of this kind not only reacts to the temperature of the air passing over it, but also to thermal radiation. Here, the sensitivity of the sensor to convection heat and to radiated heat is so balanced at lower values for velocity of flow of the air (particularly less than 0.3 m/s) that, for different levels of activity, an extremely close approximation to the optimum feeling of comfort of a person in the room can be achieved.

The level of activity which is put at approximately at 50 kcal/h · m$^2$ for sedentary work and at about three times that value for heavy physical work can, if required, be taken into account by setting to the desired value as normally occurs in thermostatic systems.

There are various practical ways of designing the temperature sensor of the invention. The sensor can, for example, be so designed that only part of its surface is exposed to heat radiation. This can be done by, for example, the sensor being of hollow cylindrical form. In this case, the wall of the bore of the hollow cylinder can be protected against thermal radiation. Part of the outer surface of the sensor can also be protected against radiation by means of a covered area.

In another embodiment, only part of the surface of the sensor exposed to radiation has radiation-absorbing properties. A bright metal portion of the surface of the sensor reflects the radiation that occurs substantially completely. In order to achieve the greatest possible uniformity of conditions, the surface of the sensor can comprise alternate zones, some absorbing radiation and the others not absorbing it. In a preferred embodiment, the sensor takes the form of a cylinder which has on its surface a plurality of spaced-apart zones having radiation-absorbing properties. A further possibility is that of imparting radiation-absorbing properties to one side of the surface of the sensor, and properties that do not absorb radiation to the other side. A sensor of this kind is also suitable for fitting on a wall, and the surface that is not sensitive to radiation should face the wall.

The surface of the sensor can be made to suit requirements if the whole of it is sensitive to radiation but has an emission factor of less than 0.8. This means that the surface is only able to absorb part of the radiation that occurs. Any combinations of forms can of course be used in which the greater part but not the whole of the surface of the sensor is sensitive to radiation, and the surface has an emission factor that is reduced to a lesser extent.

A further possibility of adapting the sensor to suit requirements is that of imparting an appropriate shape to the sensor. If the sensor takes the form of a horizontal tube having a diameter of between 1.5 and 5 mm, preferably between 2.5 and 4.5 mm, the factor for the surface-heat-transfer coefficient becomes so great that the sensor is adapted to the required purpose although its entire surface can substantially completely absorb both the thermal radiation and the convection heat.

In a further form of the invention, a transverse wall can be fitted in a sensor that takes the form of a vertical hollow cylinder. This transverse wall influences the convection flow in the interior of the hollow cylinder. This leads to a sharp bend in the characteristic curve for the operation of the sensor, (as will be explained in detail below), and this is desirable in many cases.

Furthermore, the surface condition of the sensor is preferably such that the areas that absorb horizontal radiation and those that absorb vertical radiation stand in approximately the same relationship to each other as do the corresponding areas on the human body. This enables regulation of the heat-comfort to be still further improved. The effects of radiation from a ceiling heating means for example are dealt with only in the same relationship in which they are felt by a person. The conditions are met by, for example, a sensor in the form of a vertical ellipsoid.

In another embodiment, the sensor is substantially flat and has a cross-section that diminishes towards at least two opposite sides. This again leads to a reduced area of sensor sensitive to vertical radiation. Moreover, the tapered cross-section results in convection flow that is free from eddying.

Expediently the sensor is mounted at a distance of at least 0.8 mm, and preferably more than 1.1 m, from a wall or a window. This takes into account the fact that a comfort zone in a room is usually not in the direct vicinity of a window or a wall. The height above the floor should be approximately 1 – 1.25 m, since this corresponds to the height at which the head of a person is located when he is sitting in the room.

It is however not always possible to fit the sensor at a distance from the wall. It is then also possible to provide the sensor with means for securing it to the wall, and to impart radiation-absorbing properties to only that of its sides remote from the wall. In this way the effect of heat radiation from the wall is eliminated. This can be achieved by providing it with a radiation-reflecting surface, which is for example bright or highly polished, on that side presented to the wall. Instead of this however, the side presented to the wall can be covered with an insulating coating.

In otherwise like conditions, a person feels warmer in the light than in the dark. In order to take account of this, the surface of the sensor may have a smaller absorption ratio, e.g. 0.7, as regards visible light than as regards radiation of a greater wavelength, e.g. 0.95. In particular, thermal and cold radiation belongs to the last-mentioned type of radiation.

Figure 2:
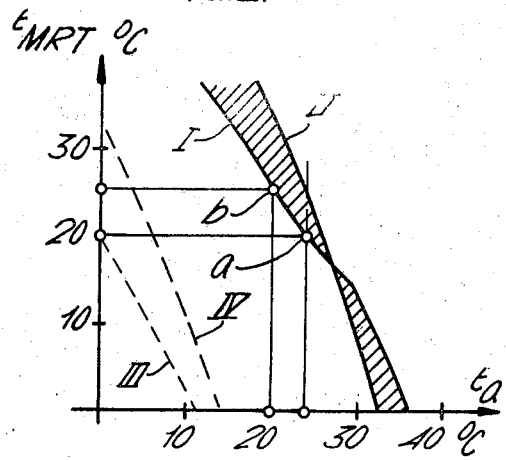
Figure 3:
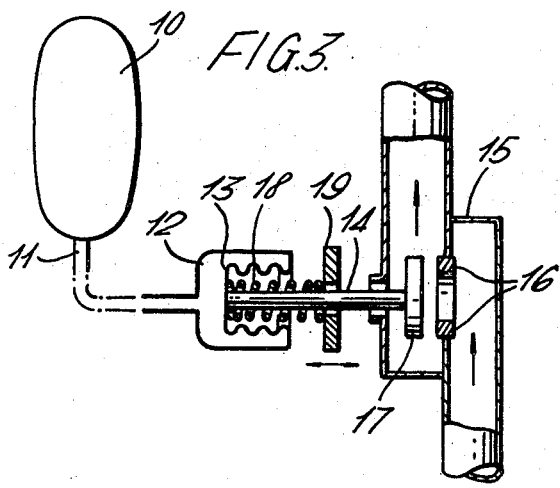
Figure 4:
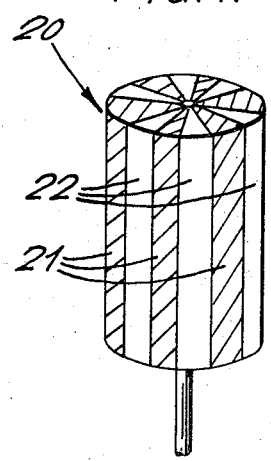
Figure 5:
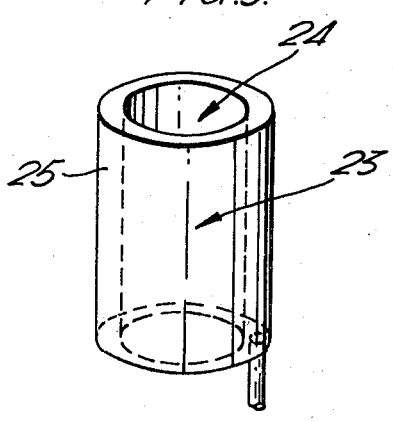
Figure 6:
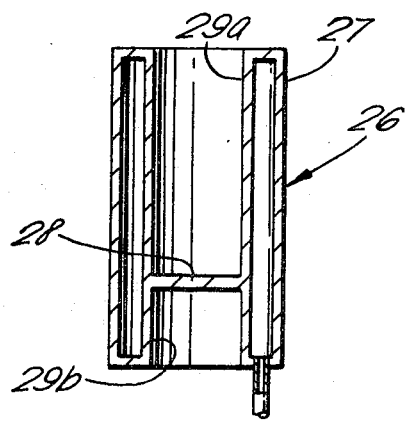

The invention will now be described in more detail by reference to the embodiments illustrated in the drawing, in which:

FIG. 1 is a schematic illustration of a room containing a sensor in accordance with the invention, FIG. 2 shows, in a graph, the relationship between room temperature $t_a$ and mean radiation temperature $t_{MRT}$ for obtaining a heat-comfort range, FIG. 3 shows a first form of the sensor in combination with a thermostatically controlled valve, FIG. 4 is a perspective view of a second form of sensor, FIG. 5 is a schematic view of a third form of sensor in accordance with the invention, FIG. 6 shows a longitudinal section through a fourth form of sensor, FIG. 7 shows a schematic view of a fifth form, FIG. 8 is a side view of a sixth form, FIG. 9 is a perspective view of a seventh form, FIG. 10 shows a horizontal section through the form of sensor shown in FIG. 9, and FIG. 11 is a vertical section through an eighth form.

FIG. 1 illustrates a room 1 bounded by walls 2, a floor 3, a ceiling 4 and a window 5. A sensor 6 is fitted at a distance of 1.50 m from the window and the wall and at a height of 1.25 m, i.e. in a comfort zone removed from the extreme conditions at the limiting surfaces. It is connected by way of a control lead 7 to a thermostatically controlled valve 8 of a heating element 9. The sensor 6 is acted upon on the one hand by the temperature $t_a$ of the air in the room which moves past it by convection, and on the other hand by the mean radiation temperature $t_{MRT}$, which depends upon the condition of the wall surfaces, the window surfaces, the surfaces of the heating element and so on, if radiation therefrom reaches the sensor. Consequently, the sensor adopts a temperature $t_f$, it being necessary for the following equation to be satisfied $$A_S \cdot \epsilon \cdot \sigma (T_{MRT}^4 - T_f^4) - A_K \cdot F \ |t_f - t_a|^{0.25} (t_f - t_a) = 0;$$

herein the various symbols have the following meanings:

$A_S$: the area in m² exposed to radiation $A_K$: the area in m² exposed to convection $\epsilon$: emission factor, a dimensionless material constant $\sigma = 5.775 \cdot 10^{-8} \ W \cdot °K^{-4} \cdot m^{-2}$ $F$ : a factor which, together with the factor $|t_f - t_a|^{0.25}$, gives the surface-heat-transfer coefficient, and has the dimension $W \cdot °C^{-1.25} \cdot m^{-2}$ $T_{MRT}$: absolute value of the mean radiation temperature in °K $T_f$: absolute value for the temperature of the sensor in °K $t_f$: temperature of the sensor in °C $t_a$: temperature of the air in the room in °C, briefly referred to as "room temperature".

In this equation, only the values $A_S$, $A_K$, $\epsilon$ and $F$ can be freely selected. $\sigma$ is a constant, and the temperatures can change depending upon the particular conditions. If the freely selectable values are brought together and related thus $$C = (A_S \cdot \epsilon)/(A_K \cdot F),$$

this relationship having the dimension $W^{-1} \cdot °C^{1.25} \cdot m^2$, then the heat-comfort conditions in the room can be regulated with surprisingly great precision if $$0.1 < C < 0.3.$$

The heat-comfort conditions can be maintained still more accurately if $$0.14 < C < 0.25.$$

In FIG. 2 curves for maximum comfort are established by plotting room temperature $t_a$ against the mean radiation temperature $t_{MRT}$. Such curves can be established by means of tests. The solid-line curves I and II apply in the case of a person sitting at a desk and wearing clothing of medium weight, curve I being associated with a velocity of air-flow due to convection of less than 0.1 m/s and curve II with an air velocity of 0.3 m/s. Since higher air velocities will of course cause discomfort, the regulating system should permit working points to be established that lie on the curves I and II or in the intermediate shaded zone. The broken-line curves III and IV are those for optimum comfort for a standing person doing heavy physical work and wearing clothing of medium weight, and here again the air velocity is below 0.1 m/s in the case of curve III, and is 0.3 m/s in the case of curve IV. It will be seen that the trends of curves I and III and of II and IV are approximately similar, i.e. that the level of activity of a person can be taken into account by displacing the comfort curves parallel with themselves.

If the temperature sensor is designed in the manner proposed in the invention, there results in the sensor a temperature that is dependent upon the room temperature and the radiation temperature in such a way that working points are obtained which lie substantially within the indicated comfort range. By displacing the required value in the thermostatic system, the above-mentioned parallel displacement and thus consideration of the level of activity of a person can be catered for.

A thermostatic system operating on the known principle would, if the required value were set to point a, e.g. at 24° C., tend to maintain this room temperature under all conditions (as shown in dash-dot lines), even when the mean radiation temperature increases or decreases. When, however, the sensor of the invention is used, the working point moves to another value, e.g. b, when the radiation temperature changes. If the mean radiation temperature rises from 20° to 26° C., the room temperature must be reduced from 24° to 20° C. in order to maintain a condition of optimum comfort.

FIG. 3 illustrates schematically a valve which is thermostatically regulated by the sensor of the invention, which valve can correspond to valve 8 in FIG. 1. The sensor 10 is in the form of an ellipsoid, the entire surface of which is exposed both to radiation add to convection. The surface is however treated in such a way that the emission factor $\epsilon$ is below 0.8. The ellipsoidal form ensures that the area upon which vertical radiation impinges stands in roughly the same relationship to the area upon which horizontal radiation impinges as the corresponding areas on the human body. It may be assumed that the sensor 10 is filled with a liquid-vapor mixture, so that the vapor pressure, which is dependent upon the temperature of the sensor, can act, by way of a capillary tube 11, in a working element 12 of the thermostatic system. The working element 12 comprises a bellows 13 which acts on the spindle 14 of a valve 15. The valve has a seat 16 and a closure member 17 connected to the spindle 14. A rated spring 18, which can be displaced together with a displaceable backing member 19, opposes the pressure inside the working element 12. Consequently, the valve is set to a predetermined value. If the temperature of the sensor 10 rises, either because of an increase in the radiation temperature or because of an increase in room temperature, the valve closes and vice versa.

FIG. 4 illustrates a sensor 20, which is of cylindrical form. The surface of the cylinder is alternately divided into zones 21, having radiation absorbing properties, and zones 22, which do not have such properties. The zones 22 can be for example bright or highly polished, and the zones 21 can be covered with a coating of lacquer. In this case again, the area exposed to radiation and that exposed to convection are equal to each other, but the surface zones 21 and 22 have a greatly differing emission factor, so that, for the entire area, a mean or effective emission factor is established which should be below 0.8. In this embodiment too, the upper area of the sensor 20, exposed to vertical radiation, is smaller than the circumferential area which is exposed to horizontal radiation, these conditions being the same as in the case of a human being.

FIG. 5 illustrates a sensor 23 which is in the form of a hollow cylinder having hollow walls accommodating the expansible medium. The inner circumferential wall 24 of the sensor 23 is largely protected against radiation and therefore deals only with heat-transfer by convection. The outer circumferential area 25 however is subject both to the effects of flow by convection and to the effects of radiation. In this case therefore the surface $A_S$, exposed to radiation, is smaller than the surface $A_K$, exposed to convection. In the case of a sensor of this kind, the entire surface can be the same all over and can have a high emission factor.

The sensor 26 in FIG. 6 corresponds to the sensor 23 in FIG. 5. It therefore has an outer circumferential area 27, which is exposed to both radiation and convection, and an inner circumferential surface which is subjected only to the effects of convection. In this case however there is provided a transverse wall 28, which divides the inner circumferential wall into an upper portion 29a and a lower portion 29b. The effect of this transverse wall is as follows: if the temperature $t_f$ of the sensor is greater than the room temperature $t_a$, then the air in the central bore of the hollow cylinder is warmed. However, only the air located above the wall 28 can rise and be replaced by air from the room. Consequently, only the upper part 29a of the inner circumferential area is subjected to the effect of convection. If however the air in the room is warmer than the sensor, the air in the inner wall of the hollow cylinder is cooled down. Only the air located below the wall 28 can flow downwards however and be replaced by air from the room. Consequently, only the lower portion 29b of the inner circumferential wall is affected by convection. This behavior leads to a sudden change when the temperature of the sensor is equal to that of the room. As a result of this change-point there is a departure from the form of curve otherwise obtained, with which the turning point in curve I can be considered as being just below the point a.

FIG. 7 shows a sensor 30 in the form of a long thin hollow rod, which is fitted horizontally and has a diameter of 4 mm. Because of its shape, a sensor of this kind has a high factor $F$ for the surface-heat-transfer coefficient. Moreover, it can be readily adapted to suit the convection flow in the comfort zone which is substantially horizontal in that area.

Whereas the sensors so far described should be fitted at a distance of at least 0.8 m, but preferably not more than 1.1 m, from the wall, the sensors described below can be secured directly to the wall.

FIG. 8 shows a spherical sensor 31, which is fitted directly to a wall 33 by means of a fixing device 32. The surface 34 of the sphere presented to the wall is bright and absorbs no radiation energy. The surface 35 of the sphere remote from the wall has radiation-absorbing properties. Consequently, the surface 34 though affected by convection flow is not influenced by radiation from the wall 33.

FIGS. 9 and 10 illustrate a sensor 36 which is secured to a wall 38 by means of a U-shaped holder 37. The sensor itself is of flat form, has a flat rear-wall 39, a flat front-wall 40 and inclined transition surfaces 41. As indicated by the arrows in FIG. 9, air from the room flows, on the one hand, through the cavity contained between the sensor 36 and the holder 37 and, on the other hand, along the outside of the sensor, the inclined transition surfaces 41 acting as means for guiding the air along a non-eddying path. Only the front-faces 40 and 41 are impinged upon by radiation. The rear-wall 39 is covered against radiation by the holder 37 which has a low emission coefficient. If there is any risk of radiation beyond a negligible amount emanating from the holder 37, the rear-wall 39 can also be bright-finished.

FIG. 11 shows a sensor 42 which is attached to a wall by means of an insulating block 43. The insulating block 43 ensures that no radiation effects whatsoever can pass from the wall to the sensor. Only the front wall 44 of the sensor 42 is effective; this wall is exposed both to convection flow and to radiation. It can have a surface that has an emission factor of less than 0.8, or a surface that absorbs radiation only partially but reflects the other portion of the radiation.

To provide a better understanding of the invention, calculations relating to some of the embodiments described will now be given.

EXAMPLE 1

If the sensor 23 shown in FIG. 5 has a height of 45 mm, an outside diameter of 25 mm and an inside diameter of 20 mm, the emission factor $\epsilon$ is 0.95 over the entire surface, and the factor $F$ is found to be 3.1 $W \cdot °C^{-1 \cdot 25} \cdot m^{-2}$. Calculated from this, $C = 0.24 \ W^{-1} \cdot °C^{1 \cdot 25} \cdot m^2$.

EXAMPLE 2

If the sensor 20 shown in FIG. 4 has a height of 35 mm and a diameter of 20 mm. The ratio of $A_S$ to $A_K$ is 1. The factor $F$ amounts to 3.5 $W \cdot °C^{-1 \cdot 25} \cdot m^{-2}$. If a value for $C$ of 0.21 $W^{-1} \cdot °C^{1 \cdot 25} \cdot m^2$ is required, an effective emission factor $\epsilon_{eff}$ of 0.73 is obtained.

If the zones 21 of the sensor 20 are coated with a lacquer, the emission factor $\epsilon$ of which is 1, this means that the zones 21 must occupy 73 percent of the total surface of the sensor.

EXAMPLE 3

In the case of the sensor 30 shown in FIG. 7, let it be assumed that the diameter of the rod is 4 mm. The ratio $A_S/A_K$ is again 1. The surface condition will be regarded as being such that the emission factor $\epsilon$ is 0.95. Because of its particular shape, this sensor has a factor F of 5.58 $W \cdot °C^{-1 \cdot 25} \cdot m^{-2}$. This leads to a value for $C$ of 0.17 $W^{-1} \cdot °C^{1 \cdot 25} \cdot m^2$.

Instead of being filled with liquid and vapor, the sensor can be filled with liquid only. The principle of the invention can be applied to bimetal sensors or to other known sensors, the shape and surface condition of which are adapted to requirements in the manner described.

I claim:

1. A passive temperature sensor for controlling a thermostat or the like comprising a bulb member containing a liquid-vapor mixture, a capillary tube attached to said bulb, a first outer surface area of said bulb exposed to heat radiation and having an emission factor $\epsilon$, a second outer surface area of said bulb exposed to convection and having a surface heat transfer coefficient $F$, the ratio of a first product equal to said first area times $\epsilon$ to a second product equal to said second area times $F$ being between 0.1 and 0.3.

2. A sensor according to claim 1 wherein said ratio is between 0.14 and 0.25.

3. A sensor according to claim 1 wherein said first area is smaller than said second area.

4. A sensor according to claim 3 including a plate for shielding a portion of the external surface of said bulb from radiation.

5. A sensor according to claim 1 wherein said bulb is a hollow cylinder.

6. A sensor according to claim 1 wherein at least a portion of said first area has radiation absorption characteristics.

7. A sensor according to claim 1 wherein said second area comprises radiation absorption zones and said first area comprises non-radiation absorption zones which alternate with said first referred to zones.

8. A sensor according to claim 7 wherein said bulb has a cylindrical shape.

9. A sensor according to claim 1 wherein said second area has radiation absorption characteristics, said first area has non-radiation absorption characteristics, said first and second areas being on opposite sides of said bulb.

10. A sensor according to claim 1 wherein said first and second areas have radiation absorption characteristics with an emission factor $\epsilon$ less than 0.8.

11. A sensor according to claim 1 wherein said bulb has the form of a horizontally extending tube with a diameter between 1.5 and 5.0 mm.

12. A sensor according to claim 1 wherein said bulb comprises cylindrically shaped walls forming an annular space for said liquid-vapor mixture and defining a central bore, and a partition extending transversely across said bore.

13. A sensor according to claim 1 wherein said first surface area has portions for absorbing horizontally and vertically directed radiation rays which approximate the same positions and ratios relative to each other as corresponding surfaces of the human body.

14. A sensor according to claim 1 wherein said bulb has the form of a vertical ellipsoid.

15. A sensor according to claim 1 wherein said bulb is substantially flat and has a cross-section which diminishes towards at least two opposite sides.

16. A sensor according to claim 1 including means for securing said bulb to a wall, said first surface area being on the side of said bulb remote from the wall.

17. A sensor according to claim 16 wherein said second surface area is adjacent the wall and has radiation reflecting characteristics.

18. A sensor according to claim 16 wherein said second surface area is adjacent the wall and is the surface of an insulating layer of material.

19. A sensor according to claim 1 wherein said surfaces have a smaller emission factor $\epsilon$ relative to visible light than to radiations of greater wavelength.

* * * * *